(No Model.)
D. T. CHAMBERS.
HOLDBACK FOR VEHICLE SHAFTS.
No. 322,159. Patented July 14, 1885.
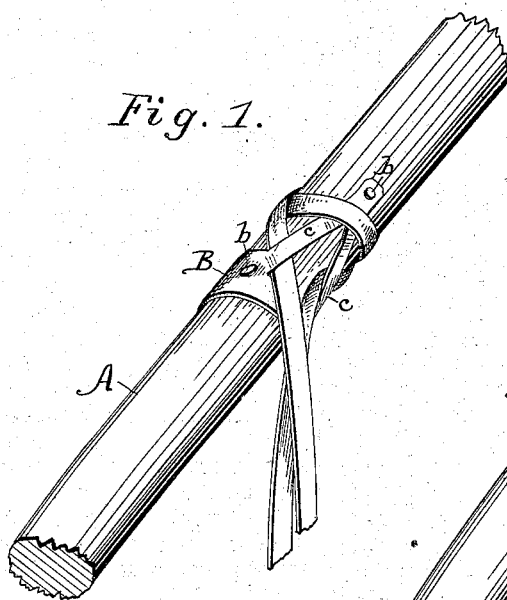
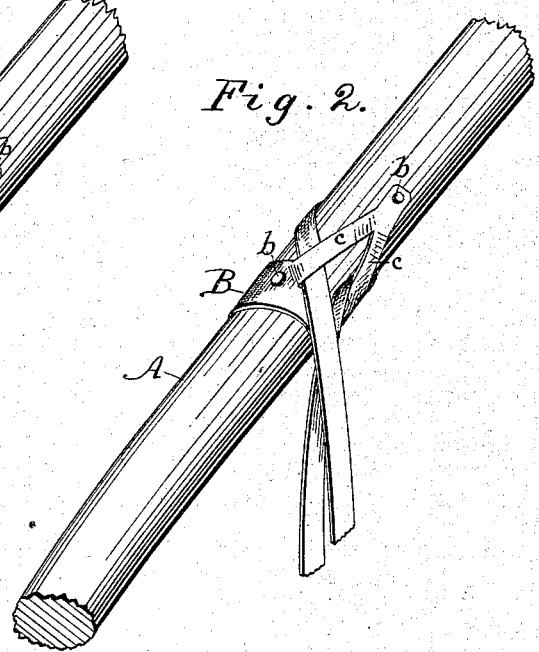
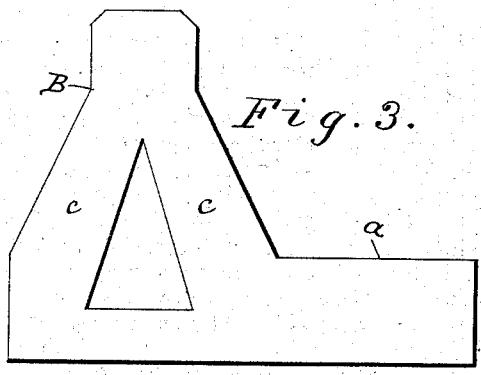
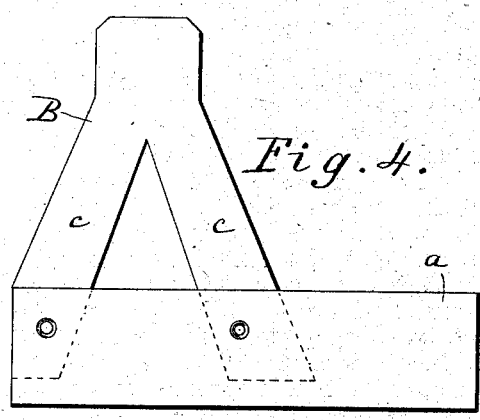
WITNESSES:
Thos. Houghton.
Edw. U. Byrn.
INVENTOR:
D. T. Chambers
BY Munn & Co.
ATTORNEYS.

UNITED STATES PATENT OFFICE.

DANIEL THOMAS CHAMBERS, OF MECHANICSBURG, OHIO, ASSIGNOR TO HIMSELF AND EMBURY P. CLARK, OF HOLYOKE, MASSACHUSETTS.

HOLDBACK FOR VEHICLE-SHAFTS.

SPECIFICATION forming part of Letters Patent No. 322,159, dated July 14, 1885.

Application filed June 2, 1885. (No model.)

*To all whom it may concern:*

Be it known that I, DANIEL T. CHAMBERS, a citizen of the United States, residing at Mechanicsburg, in the county of Champaign and State of Ohio, have invented a new and useful Improvement in Holdbacks for Vehicle-Shafts, of which the following is a description.

Figure 1 is a perspective view of the inside of a shaft, showing my invention applied thereto. Fig. 2 is a similar view showing a different mode of wrapping the breeching-strap. Fig. 3 is an enlarged view of my holdback, showing it flattened out and just as stamped from a single piece of leather; and Fig. 4 is a similar view showing it made of two pieces.

My invention relates to holdbacks for the shafts of vehicles, which are designed to receive the strain of the breeching-straps.

The object of the invention is to provide a holdback which forms a simple and secure attachment of the breeching to the shafts, and which avoids the chafing and wearing of the strap and the shaft, is cheaply made, easily applied or removed, and universal in its application.

To these ends it consists in a triangular-shaped piece of material with a hole through it and applied to the shaft, as hereinafter fully described.

In the drawings, A represents the shaft, and B is the holdback. This holdback is preferably made of leather or other flexible substance, but may be made of metal, rawhide, or any other material. This holdback is formed in a triangular shape, with a corresponding opening in the center, and has an extension or tongue, *a*, at one of the sides of the triangle. This holdback may be stamped out in one piece, as shown in Fig. 3, or may be made of two or more pieces, as shown in Fig. 4. The holdback is applied to the shaft with the triangular portion on the inner side of the shaft, and secured at its three corners by screws or nails *b*, the tongue portion *a* being wrapped around and nailed or screwed to the shaft for the purpose of forming a more secure attachment. This tongue may, however, in some instances be dispensed with.

In securing the breeching-strap it may be passed once around the shaft with its rearwardly-extending portions passing under the side sections, *c c*, of the triangular holdback, as in Fig. 2; or the breeching-strap may have a turn once around the shaft on the outside of the side sections, *c c*, and be then returned to the rear under said side sections, as in Fig. 1.

In using the old style of loop or hook holdback mishaps frequently occur, not from the strap or shaft failing, but from the failure of the loop or hook on the under side of the shaft. With my improvement the shaft and strap bear all the strain, the triangular holdback simply keeping the strap in its place. This holdback having two side sections, *c c*, is doubly secure, for if one should break the remaining section would still hold the strap in its place.

By its use the holdback-strap does not necessarily require wrapping around the shaft in order to make it hold secure, but it may or may not be wrapped around, according to the length of the strap.

Having thus described my invention, what I claim as new is—

1. A holdback for the shafts of a vehicle, consisting of a triangular piece of material having a hole in the middle, as and for the purpose described.

2. A holdback for the shafts of a vehicle, consisting of a triangular piece of material having a hole in the middle of it, and a projecting tongue at one of the sides of the triangle, substantially as shown and described.

3. The combination, with the shaft of a vehicle, of a holdback made in triangular form of one or more pieces with a hole in the middle, and a projecting tongue, *a*, the said tongue being screwed or nailed around the shaft, and the triangular portion being disposed on the inside of the shaft and secured thereto at its corners, substantially as shown and described.

DANIEL THOMAS CHAMBERS.

Witnesses:
PORTER UNDERWOOD,
EMBURY P. CLARK.